United States Patent
Chauvin et al.

(10) Patent No.: US 11,617,189 B2
(45) Date of Patent: Mar. 28, 2023

(54) POWER OPTIMIZED UPLINK GRANT SKIPPING

(71) Applicant: QUALCOMM Incorporated, San Diego, CA (US)

(72) Inventors: Michel Evan Chauvin, San Diego, CA (US); Arnaud Meylan, San Diego, CA (US); Bao Vinh Nguyen, San Diego, CA (US); Peng Wu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/211,661

(22) Filed: Mar. 24, 2021

(65) Prior Publication Data

US 2022/0312443 A1 Sep. 29, 2022

(51) Int. Cl.
*H04W 72/14* (2009.01)
*H04W 72/1268* (2023.01)

(52) U.S. Cl.
CPC ....... *H04W 72/1268* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 11,399,394 B2* | 7/2022 | Höglund | H04W 74/0833 |
| 2017/0318594 A1* | 11/2017 | Babaei | H04W 72/087 |
| 2017/0318595 A1* | 11/2017 | Dinan | H04L 5/0053 |
| 2017/0332399 A1* | 11/2017 | Yi | H04W 76/10 |
| 2018/0007669 A1* | 1/2018 | Yi | H04W 72/14 |
| 2018/0279358 A1* | 9/2018 | Babaei | H04W 72/14 |
| 2019/0159197 A1* | 5/2019 | Shrestha | H04W 74/0866 |
| 2019/0166519 A1 | 5/2019 | Kunt et al. | |
| 2019/0320467 A1* | 10/2019 | Freda | H04W 74/004 |

(Continued)

OTHER PUBLICATIONS

CATT: "Correction for DG and CG UL Skipping with UCI Overlap", 3GPP TSG-RAN WG2 Meeting #113-e, R2-2100218, 3GPP, Online, Jan. 25-Feb. 5, 2021, 4 Pages, URL: https://ftp.3gpp.org/tsg_ran/WG2_RL2/TSGR2_113-e/Docs/R2-2100218.zip 38.321_CR1009_(Rel-16)_R2-2100218 Correction for DG and CG UL skipping with UCI overlap.docx.

(Continued)

*Primary Examiner* — Kodzovi Acolatse
(74) *Attorney, Agent, or Firm* — Qualcomm Incorporated (57) ABSTRACT

A method of wireless communication by a user equipment (UE) includes receiving a number of uplink grants from a base station. The method further includes estimating a payload size for data to be transmitted from a UE buffer for a number of logical channels. The payload size corresponds to a sum of a number of data bytes to be transmitted and an amount of overhead bytes to be transmitted. The method still further includes determining a subset of the number of uplink grants to use for uplink transmission based on reducing a total padding size associated with transmitting the payload size, for each combination of the number of uplink grants. The method also includes transmitting the data from the UE buffer within a number of transport blocks, to the base station. The number of transport blocks corresponds to the subset of the number of uplink grants.

22 Claims, 6 Drawing Sheets

(56) References Cited

U.S. PATENT DOCUMENTS

| | | |
|---|---|---|
| 2020/0053820 A1* | 2/2020 | Chin ................. H04W 72/1242 |
| 2020/0383134 A1 | 12/2020 | Tirronen et al. |
| 2021/0084673 A1 | 3/2021 | Nguyen et al. |
| 2022/0159708 A1* | 5/2022 | Alabbasi ............... H04L 1/1812 |
| 2022/0174683 A1* | 6/2022 | Alabbasi ............... H04W 72/10 |

OTHER PUBLICATIONS

International Search Report and Written Opinion—PCT/US2022/016025—ISA/EPO—dated May 24, 2022.

* cited by examiner

POWER OPTIMIZED UPLINK GRANT SKIPPING

FIELD OF THE DISCLOSURE

The present disclosure relates generally to wireless communications, and more specifically to power optimized uplink grant skipping.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In one aspect of the present disclosure, a method of wireless communication by a user equipment (UE) includes receiving a number of uplink grants from a base station. The method further includes estimating a payload size for data to be transmitted from a UE buffer for a number of logical channels. The payload size corresponds to a sum of a number of data bytes to be transmitted and an amount of overhead bytes to be transmitted. The method still further includes determining a subset of the number of uplink grants to use for uplink transmission based on reducing a total padding size associated with transmitting the payload size, for each combination of the number of uplink grants. The method also includes transmitting the data from the UE buffer within a number of transport blocks, to the base station, the number of transport blocks corresponding to the subset of the number of uplink grants.

Another aspect of the present disclosure is directed to an apparatus of a user equipment (UE) for wireless communication having a memory and one or more processors coupled to the memory. The processor(s) is configured to receive a number of uplink grants from a base station. The processor(s) is further configured to estimate a payload size for data to be transmitted from a UE buffer for a number of logical channels. The payload size corresponds to a sum of a number of data bytes to be transmitted and an amount of overhead bytes to be transmitted. The processor(s) is still further configured to determine a subset of the number of uplink grants to use for uplink transmission based on reducing a total padding size associated with transmitting the payload size, for each combination of the number of uplink grants. The processor(s) is also configured to transmit the data from the UE buffer within a number of transport blocks, to the base station. The number of transport blocks corresponds to the subset of the number of uplink grants.

Another aspect of the present disclosure is directed to a method of wireless communication by a user equipment (UE) that includes receiving a number of uplink grants from a base station. The method further includes estimating a payload size for data to be transmitted from a UE buffer for a number of logical channels. The payload size corresponds to a sum of a number of data bytes to be transmitted and an amount of overhead bytes to be transmitted. The method still further includes determining mandatory grants from the number of uplink grants as grants containing uplink control information or grants satisfying logical channel prioritization (LCP) restrictions. The method also includes generating a list of grants starting with the mandatory grants in response to determining whether a slot has non-mandatory grants, and a total buffer size is less than a sum of the number of uplink grants, and a number of cycles for determining a subset of grants based on reducing a total padding size is less than a threshold. The list includes, after the mandatory grants, the non-mandatory grants ordered to reduce the total padding size associated with transmitting the payload size. The method further includes transmitting the data from the UE buffer within a number of transport blocks, to the base station, the number of transport blocks selected from the list.

Another aspect of the present disclosure is directed to an apparatus of a user equipment (UE) for wireless communication, the apparatus having a memory and one or more processors coupled to the memory. The processor(s) is configured to receive a number of uplink grants from a base station. The processor(s) is further configured to estimate a payload size for data to be transmitted from a UE buffer for a number of logical channels. The payload size corresponds to a sum of a number of data bytes to be transmitted and an amount of overhead bytes to be transmitted. The processor(s) is still further configured to determine mandatory grants from the number of uplink grants as grants containing uplink control information or grants satisfying logical channel prioritization (LCP) restrictions. The processor(s) is also configured to generate a list of grants starting with the mandatory grants in response to determining whether a slot has non-mandatory grants, and a total buffer size is less than a sum of the number of uplink grants, and a number of cycles for determining a subset of grants based on reducing a total padding size is less than a threshold. The list includes, after the mandatory grants, the non-mandatory grants ordered to reduce the total padding size associated with transmitting the payload size. The processor(s) is further configured to transmit the data from the UE buffer within a number of transport blocks, to the base station, the number of transport blocks selected from the list.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Fifth generation (5G) new radio (NR) technology promises high throughput with the use of increased bandwidth and an increased number of component carriers. In some cases, however, a user equipment (UE) receives larger uplink (UL) grants or more uplink grants than necessary. For example, with inefficient or simple schedulers, a predictive uplink scheduler at the base station (e.g., gNB) may periodically provide unnecessary uplink grants. The gNB may transmit, to the UE, larger or more grants than necessary (e.g., to keep latency low or drain the buffers by giving several additional grants at the end of a burst).

Specific absorption rate (SAR) and maximum permissible exposure (MPE)-limited scenarios may also affect the use of uplink grants. SAR and MPE are Federal Communications Commission (FCC) rules for uplink transmission power limits, meant to protect the public from electro-magnetic field (EMF) over-exposure. In some cases, the UE may not use all of its scheduled grants if the UE has used up its SAR or MPE budget. Inefficient uplink transmissions may drain the UE battery and precipitate the UE toward SAR and MPE-limited situations, which may cause the UE's SAR and MPE modules to shut off the UE's uplink.

When the UE receives more grants than necessary, and is permitted to skip uplink grants, the UE should attempt to skip grants in the most efficient way possible. Previously, a UE was only permitted to skip one uplink grant. Therefore, the UE did not need a solution for selecting the best subset of grants to skip. Aspects of the present disclosure propose methods that improve the efficiency of the UE's uplink transmission by selecting a more power-efficient subset of grants out of the totality of grants received by the UE.

When the UE receives more uplink grants than necessary, the UE currently processes the uplink grants in the order that they become available at the UE. The UE starts filling transport blocks (TBs) with user data until all (or the desired or permitted) queues have been drained. The remaining unused bytes in the TBs are padded. Completely unused TBs may be skipped if an uplink grant transmission skipping feature is enabled. Uplink transmission consumes a significant amount of energy. Thus, skipping uplink transmissions may save energy.

If the UE has less data to transmit than was granted, the UE can skip the last N grants in the list of grants received from the network. However, skipping the last N grants is not the most efficient method of skipping uplink grants and may lead to inefficient or wasteful uplink transmissions because the UE may use a subset of TBs that are larger than necessary, thus, consuming more power than necessary. More specifically, an impact of inefficient or wasteful transmissions may include faster UE battery drain and uplink transmission power limits imposed by the specific absorption rate (SAR) or maximum permissible exposure (MPE) modules. The uplink transmission power limits may cause the UE to transmit at an uplink transmission power lower than specified to ensure reliable communications, or may cause the uplink to be shut-off by the SAR or MPE modules. In some cases, if the UE is shut-off for long periods of time, the network may drop the UE.

Aspects of the present disclosure propose methods to improve the efficiency of UE uplink transmissions by using one or a combination of techniques to find an improved or even optimal subset of uplink grants (referred to as an 'optimal' subset for the sake of simplicity). The optimal subset of grants may be characterized by a power efficient transmission, such as lowest energy per bit or byte. In some aspects, an overhead estimation function computes the total data plus overhead that the UE needs to transmit. Further aspects of the present disclosure use padding bytes in the optimization techniques as a lower cost metric than computing total energy per bit or byte, to compare and find the optimal subset of the received grants. In some aspects, the techniques consider logical channel prioritization (LCP) restrictions to improve the accuracy in the presence of LCP restrictions imposed by the network.

The techniques of the present disclosure enable more efficient uplink transmissions because the UE uses a more power efficient subset of grants with less padding to transmit. Moreover, the UE is more likely to skip more grants leading to longer battery life and the UE being limited less often by the specific absorption rate (SAR) and maximum permissible exposure (MPE) compliance modules. Other advantages include improvement in transmission control protocol (TCP) downlink performance (e.g., throughput) due to timely TCP downlink feedback (e.g., acknowledgments/negative acknowledgments (ACKs/NACKs) if the uplink is not limited by SAR or MPE modules as frequently). In some aspects, the UE experiences better battery power conservation due to increased uplink transmission efficiency due to less padding and fewer TBs used.

Figure 1:
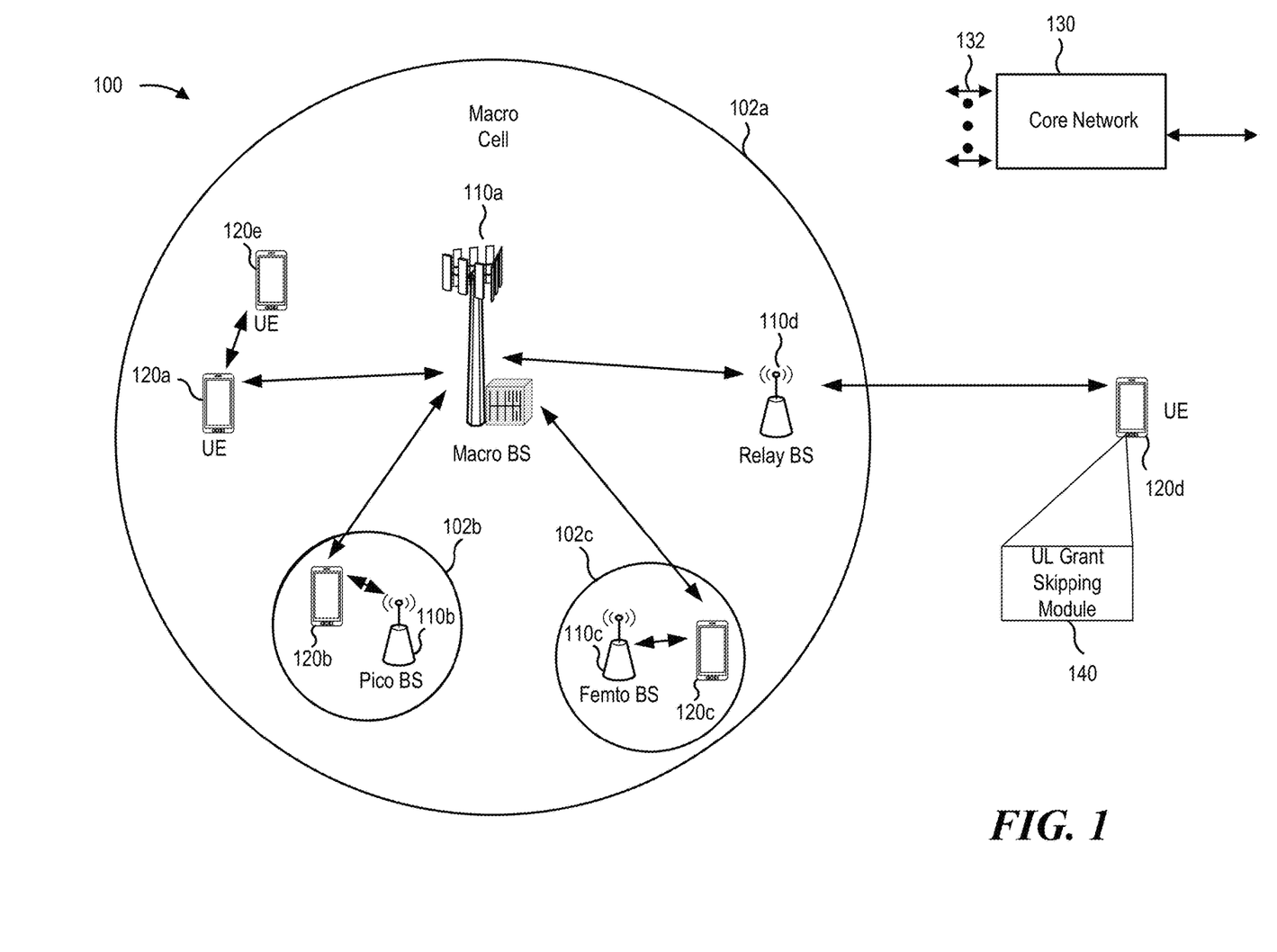
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an uplink grant skipping module 140. For brevity, only one UE 120d is shown as including the uplink grant skipping module 140. The uplink grant skipping module 140 may receive a set of uplink grants from a base station and estimate a payload size for data to be transmitted from a UE buffer for a set of logical channels. The payload size corresponds to a sum of a number of data bytes to be transmitted and an amount of overhead bytes to be transmitted. The grant skipping module 140 may also determine a subset of the set of uplink grants to use for uplink transmission based on reducing a total padding size associated with transmitting the payload size, for each combination of the set of uplink grants. The grant skipping module 140 may also transmit the data from the UE buffer within a set of transport blocks, to the base station. The set of transport blocks corresponds to the subset of the set of uplink grants.

The grant skipping module 140 may also receive uplink grants from a base station and estimate a payload size for data to be transmitted from a UE buffer for a group of logical channels. The payload size corresponds to a sum of a number of data bytes to be transmitted and an amount of overhead bytes to be transmitted. The grant skipping module 140 may further determine mandatory grants from the uplink grants as grants containing uplink control information or grants satisfying logical channel prioritization (LCP) restrictions. The grant skipping module 140 may generate a list of grants starting with the mandatory grants in response to determining whether a slot has non-mandatory grants, and a total buffer size is less than a sum of the uplink grants, and a number of cycles for determining a subset of grants based on reducing a total padding size is less than a threshold. The list includes, after the mandatory grants, the non-mandatory grants ordered to reduce the total padding size associated with transmitting the payload size. The grant skipping module 140 may transmit the data from the UE buffer within a number of transport blocks, to the base station, the number of transport blocks selected from the list.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC)

signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
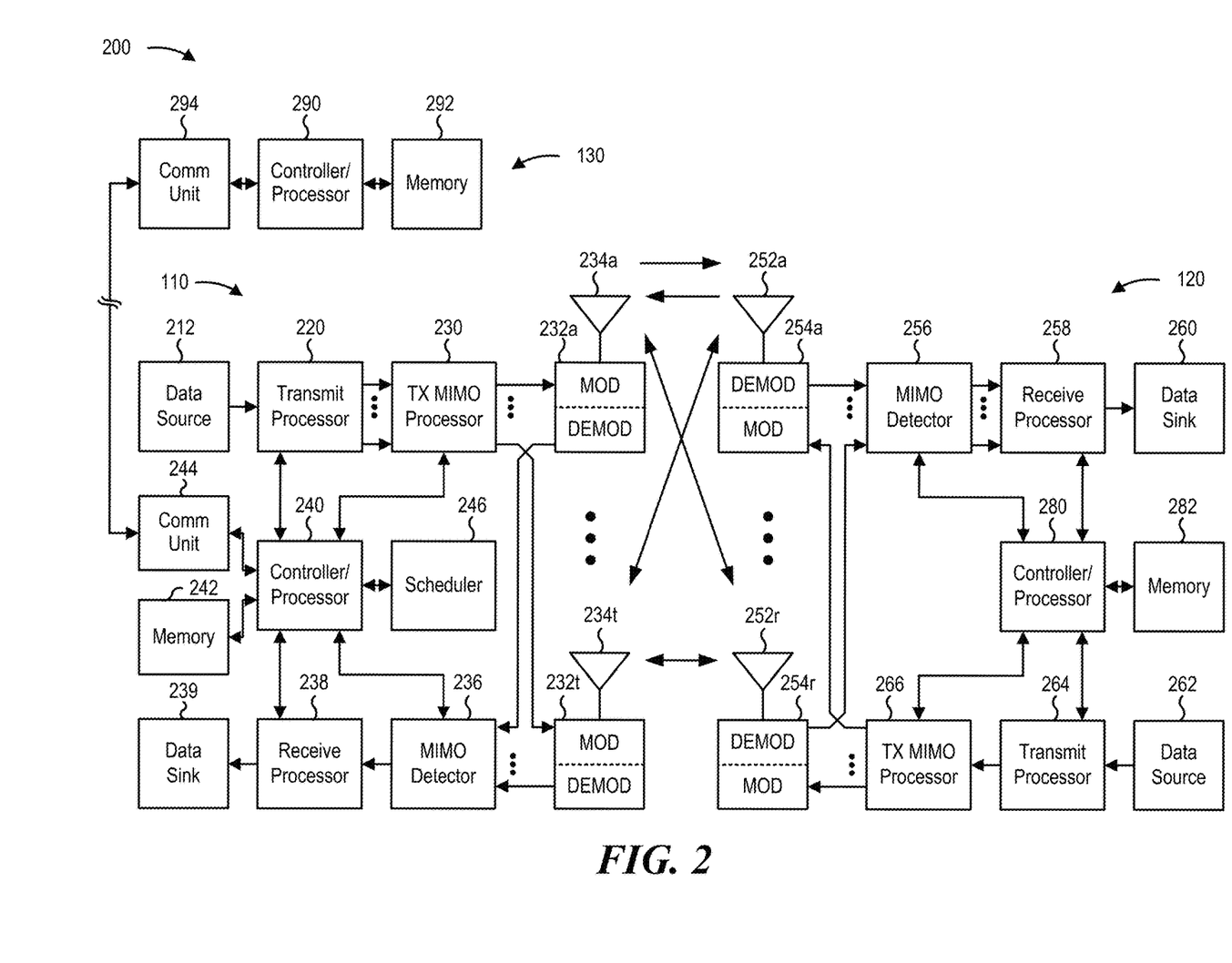
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T>1 and R>1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with power optimized uplink grant skipping, as described in more detail elsewhere. For example, the controller/processor 240 of the base station 110, the controller/processor 280 of the UE 120, and/or any other component(s) of FIG. 2 may perform or direct operations of, for example, the processes of FIGS. 5 and 6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for estimating, means for determining, means for transmitting, means for generating, means for limiting, means for including, and means for ignoring. Such means may include one or more components of the UE 120 or base station 110 described in connection with FIG. 2.

As indicated above, FIG. 2 is provided merely as an example. Other examples may differ from what is described with regard to FIG. 2.

Fifth generation (5G) new radio (NR) technology promises high throughput with the use of increased bandwidth and an increased number of component carriers. In some cases, however, a user equipment (UE) receives larger or more uplink (UL) grants than necessary. For example, with inefficient or simple schedulers, a predictive uplink scheduler at the base station (e.g., gNB) may periodically provide unnecessary uplink grants. The gNB may transmit, to the UE, larger or more grants than necessary (e.g., to keep latency low or drain the buffers by giving several additional grants at the end of a burst). With uplink split bearers, a first and second cell may have slow coordination and one cell may continue to schedule the UE despite the UE's buffer already being drained by the other cell.

Specific absorption rate (SAR) and maximum permissible exposure (MPE)-limited scenarios may also affect the use of uplink grants. SAR and MPE are Federal Communications Commission (FCC) rules for uplink transmission power limits, meant to protect the public from electro-magnetic field (EMF) over-exposure. In some cases, the UE may not use all of its scheduled grants if the UE has used up its SAR or MPE budget. Inefficient uplink transmissions may drain the UE battery and precipitate the UE toward SAR and MPE-limited situations, which may cause the UE's SAR and MPE modules to shut off the UE's uplink.

When the UE receives more grants than necessary, and is permitted to skip uplink grants, the UE should attempt to skip grants in the most efficient way possible. In conventional systems, a UE was limited to skipping one uplink grant. Therefore, the UE did not need a solution for selecting the best subset of grants to skip. Aspects of the present disclosure propose methods that improve the efficiency of the UE's uplink transmission by selecting a more power-efficient subset of grants out of the totality of grants received by the UE.

Base stations (e.g., gNBs) may grant the UE additional and larger uplink grants than needed or desired. When the UE is over-granted, the UE may not be able to, or want to, transmit in all of the grants received from the network. There are three categories of reasons for why the UE may not be able to, or want to, use all of the uplink grants allocated by the gNB. The first category is unforeseen or unpredictable situations, such as SAR and MPE-limited situations. A second category includes uplink scheduler error and issues, such as imperfect feedback (e.g., a buffer status report (BSR), power headroom report (PHR), etc.). In a third category, generous schedulers may try to assist the UE by draining its buffers and keeping latency low.

While some uplink scheduler errors will be improved over time, there may be errors between the UE's desired grant size(s) and the scheduled grants due to the issues previously discussed. Without a method to select a power efficient subset of grants, the UE may select grants that waste uplink transmission power, battery power, and accelerate the UE toward undesirable SAR or MPE-limited scenarios, such as transmission power limits or complete uplink shut-off.

In maximum permissible exposure (MPE)-limited situations, the UE may no longer be able to use, or want to use, the entire uplink grant(s) in the following MPE-limited situations. Initially, the MPE sensor may not detect human tissue (e.g., detection result index (DRI) measurement=$DRI_{max}$) and the UE may report a large buffer in the buffer status report (BSR). By the time the uplink grant is given to the UE, the MPE module has detected human tissue nearby or an MPE update occurred, and the new MPE threshold Pmax imposed on the UE's uplink is very limiting. The UE may no longer want to perform the uplink transmission or it may decide it can only transmit a small amount of high priority data. In another situation, the UE may have a good MPE budget at the time of transmitting the BSR and it may send a large BSR. While waiting for an uplink grant (e.g., due to a scheduling delay), the UE may receive a large amount of downlink (DL) data for which it has to send downlink hybrid automatic repeat request (HARD) feedback on the uplink (e.g., physical uplink control channel (PUCCH)). A significant portion of the MPE budget may be spent on PUCCH transmissions, and as a result, the UE may be left with a small MPE budget. The UE may not be able to transmit low priority traffic (e.g., physical uplink shared channel (PUSCH)) because it risks having no MPE budget left to transmit high priority signaling (PUCCH) and transmission control protocol (TCP) acknowledgements (ACKs), which can severely limit the downlink performance.

A UE may allocate its MPE budget according to traffic priority, ranging from high priority to low priority. For example, the UE may use three classes of traffic: class 1) PUCCH; class 2) PUSCH L2 (layer two) control packet (e.g., radio link control (RLC) status report to enable the downlink); and class 3) low priority PUSCH data packets. The UE may have MPE power available to transmit the higher priority traffic (e.g., class 1 and class 2 traffic) but not lower priority traffic (e.g., class 3 traffic), which is typically much larger, and not always as delay-sensitive, as class 1 and class 2 traffic. Generally, the gNB is unaware of the MPE constraints at the UE. A power headroom report (PHR) and a buffer status report (BSR) may help the base station to estimate the proper uplink grant size, but the PHR and BSR reports are transmitted on PUSCH, which may not transmit if the grant is too big (e.g., the UE has no power for this large grant).

For aged data, the UE may request an uplink grant for data and the UE may later determine that it no longer wants to transmit the data after waiting for the uplink grant. For example, with voice data, the sequence is important. If the data becomes aged or obsolete (e.g., data with a short discard timer, etc.), the UE may decide not to transmit the data because it is out of sequence. This places the UE in an unforeseen or unpredictable position where the UE may only have a small amount of data left to transmit.

In some examples, a mismatch may occur between the UE's desired grant size and grants allocated by the gNB. A network may estimate it is acting in the best interest of the UE by over-granting the UE, but if the UE only has a small amount of data to send, over-granting occurs. For example, the gNB may over-grant to reduce latency and flush the UE buffers after a long SR-BSR-UL (scheduling request-buffer status report-uplink) grant wait cycle, or to give the UE a larger grant when the UE is the only UE in the cell or the last UE to be scheduled and there are remaining resources.

A gNB uplink scheduler may experience grant size errors. Predictive schedulers are known to over-grant. A processor-power-limited gNB may implement a sub-optimal uplink scheduler (e.g., to handle a large number of UEs) and the sub-optimal scheduling may result in uplink grant size error. Grant size error may be introduced due to quantization of the buffer size(s) caused by BSR-to-BSR index mapping tables.

When the UE receives more uplink grants than necessary, the UE currently processes the uplink grants in the order that they become available at the UE. The UE starts filling transport blocks (TBs) with user data until all (or the desired or permitted) queues have been drained. The remaining unused bytes in the TBs are padded. Completely unused TBs may be skipped if the uplink grant transmission skipping feature is enabled. Uplink transmission consumes a significant amount of energy. Thus, skipping uplink transmissions may save energy.

If the UE has less data to transmit than was granted, the UE can skip the last N grants in the list of grants received from the network. However, skipping the last N grants is not the most efficient method of skipping uplink grants and may lead to inefficient or wasteful uplink transmissions because the UE may use a subset of TBs that are larger than necessary, consuming more power than necessary. More specifically, an impact of inefficient or wasteful transmissions may include faster UE battery drain and uplink (UL) transmission power limits imposed by the specific absorption rate (SAR) or maximum permissible exposure (MPE) modules. The uplink transmission power limits may cause the UE to transmit at an uplink transmission power lower than specified to ensure reliable communications, or may cause the uplink to be shut-off by the SAR or MPE modules. In extreme cases, if the UE is shut-off for long periods of time, the network may drop the UE.

Aspects of the present disclosure propose methods to improve the efficiency of UE uplink transmissions by using one or a combination of techniques to quickly find an improved or even optimal subset of uplink grants (referred to as an 'optimal' subset for the sake of simplicity). The optimal subset of grants may be characterized by a power efficient transmission, such as lowest energy per bit or byte. In some aspects, an overhead estimation function computes the total data plus overhead that the UE needs to transmit. Further aspects of the present disclosure use padding bytes in the optimization techniques as a lower cost metric than computing total energy per bit or byte, to compare and find the optimal subset of the received grants. In some aspects, the techniques consider logical channel prioritization (LCP) restrictions to improve the accuracy in the presence of LCP restrictions imposed by the network.

Figure 3:
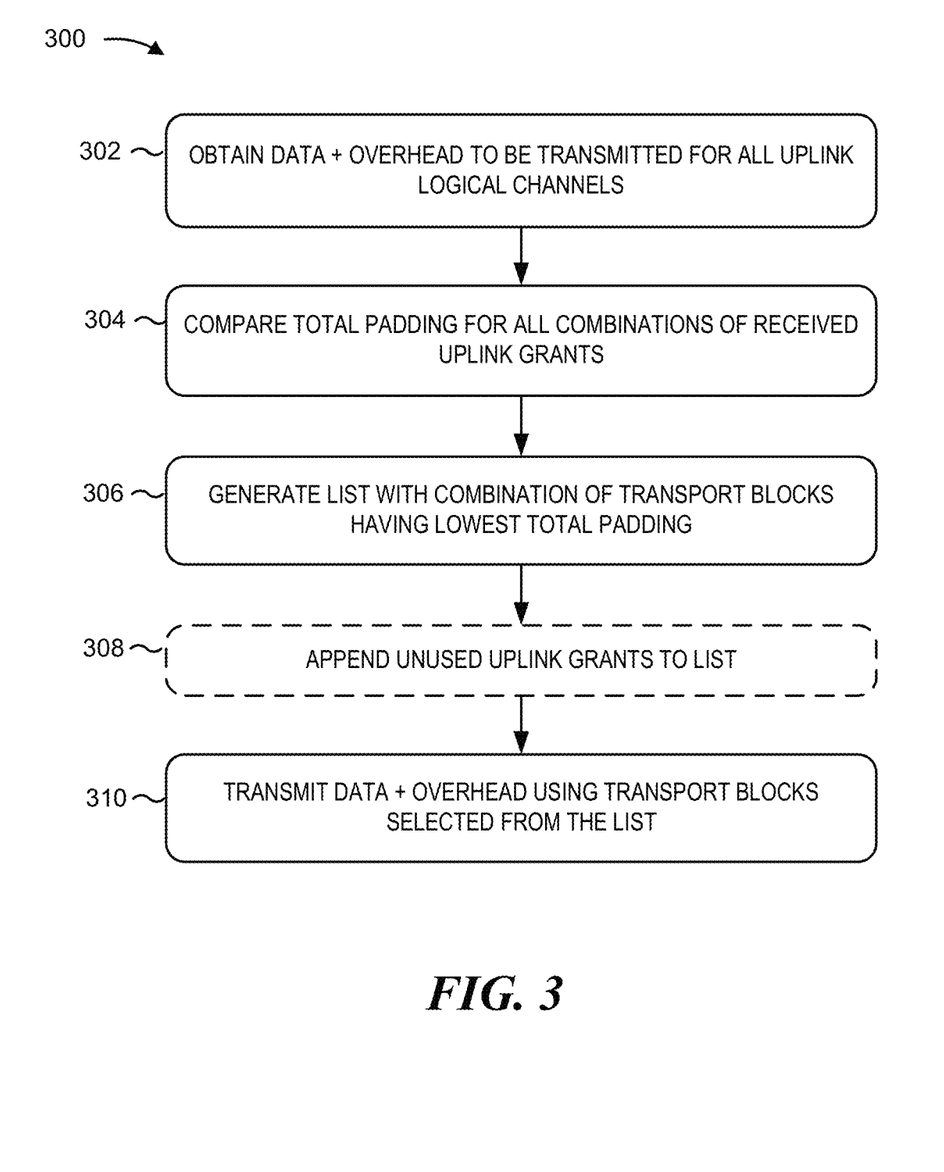
FIG. 3 is a flow diagram illustrating an example process for a first technique of power optimized grant skipping, in accordance with aspects of the present disclosure.

FIG. 3 is a flow diagram illustrating an example process 300 for a first technique of power optimized grant skipping, in accordance with aspects of the present disclosure. At block 302, a user equipment (UE) may estimate the total data plus overhead for all uplink logical channels (LCs) to be transmitted. In other aspects, the UE has this information available. Estimating may be based on equation (1), shown below.

The total data plus overhead for all LCs may be estimated by:

$$D_{all\ LCs} = \left(\frac{100 + OH}{100}\right) * \sum_{l=0}^{N_{LC}-1} B_l \quad (1)$$

where $D_{all\ LCs}$ is the estimate for all LCs of the total data plus overhead for layers including packet data convergence protocol (PDCP), radio link control (RLC) and media access control (MAC), OH is the amount of predicted overhead, $B_l$ is the user payload associated with LC "1", and $N_{LC}$ is the number of non-zero LCs. In some examples, the parameter OH is set to 5%, although other values are also contemplated.

At block 304, the UE may search for an optimal subset of received uplink grants by comparing all combinations of the received uplink grants using total padding bytes as the comparison metric. At block 306, the UE generates a list based on the combination of transport blocks (TBs) resulting in the lowest total padding. In some aspects, the used grants are sorted in descending order, with the smallest grant at the end of the list. This list may be referred to as "opt_grants." In some aspects, the lower packet data convergence protocol (PDCP) sequence number (SN) appears in the larger TB. In some cases, however, the smallest SN number may not be in the largest TB. For example, several parallel SNs may exist, such as with multiple logical channel counters, or the SN may wrap such that a lower priority logical channel may have smaller SNs that a higher priority logical channel.

In optional aspects, at block 308, the grants that are not selected are sorted in ascending order and appended to the "opt_grants" list. Thus, the module building the TBs may make the final decision on which TBs to use. For example, if the module building the TBs needs additional grant space, the module may select one or more unused TBs. This example may occur in cases when the payload plus overhead estimate is lower than the total number of bytes actually needed or when additional packets have arrived in the meantime.

Finally, at block 310, the UE prepares uplink data for transmission based on the optimal set of grants in the "opt_grants" list, starting with the first listed grant and stopping when all uplink data is allocated to a grant. The runtime complexity of this technique is $O(2^{N_{TB}})$, where O is the big O notation for complexity and $N_{TB}$ is the number of transport blocks.

Benefits of this technique may include fast execution speed and the ability to operate with total buffer size. That is, the technique does not break down data for each logical channel, which saves memory. Other benefits may include the ability to be implemented in such a way that the technique can accept new grants and re-use past results, which is incremental, instead of re-iterating over all possible combinations. These enhancements are easy to implement with a small amount of program code and a small memory footprint. The technique performs well despite not handling logical channel prioritization (LCP) restrictions.

Logical channel prioritization (LCP) restrictions are quality of service (QoS) parameters configured by the base station (e.g., gNB) using radio resource control (RRC) configuration. One of the main drivers of LCP restrictions is ultra-reliable low latency communication (URLLC). LCP restrictions are configured by the gNB when the gNB wants to force the UE to use certain resources, such as highly reliable grants, for certain logical channels (LCs), such as an LC used for URLLC. The following LCP restrictions may be configured by the gNB, per LC, using the LogicalChannelConfig (IE): allowedServingCells, allowedSCS-List, maxPUSCH-Duration, and configuredGrantType 1 Allowed.

When the UE is configured with LCP restrictions, the UE can only put data from an LC in a TB if the LCP restrictions permit the UE to do so. If LCP restrictions are not considered, the techniques of the present disclosure may not be providing the uplink layer two (L2) module with the optimal subset of grants needed by the uplink L2 module to drain its buffers.

Some aspects of the present disclosure consider LCP restrictions. In a second technique, which considers LCP restrictions, the UE estimates the total data plus overhead for each LC in accordance with equation (2). The runtime complexity of this technique is also $O(2^{N_{TB}})$.

The data plus overhead associated with each LC may be estimated by:

$$D_l = \left(\frac{100 + OH}{100}\right) * B_l, \quad (2)$$

where $D_l$ is the data plus overhead estimate (for PDCP, RLC and MAC layers) for LC "1", OH is the amount of predicted overhead, and $B_l$ is the user payload associated with LC "1".

In these aspects of the present disclosure, the UE builds a list of LCP groups based on the LCP restrictions of each LC, starting with the highest priority LC. An LCP group may be characterized by LCs with the same set of LCP restrictions. The UE processes the LCP groups based on the number of groups. In some implementations, if there are no LCP restrictions or the number of LCP groups is more than two, the first technique described above for comparing all combinations is implemented with the total payload calculation excluding overhead. Overhead is excluded from this calculation because overhead was accounted for in equation (2) and should not be counted twice.

Figure 4:
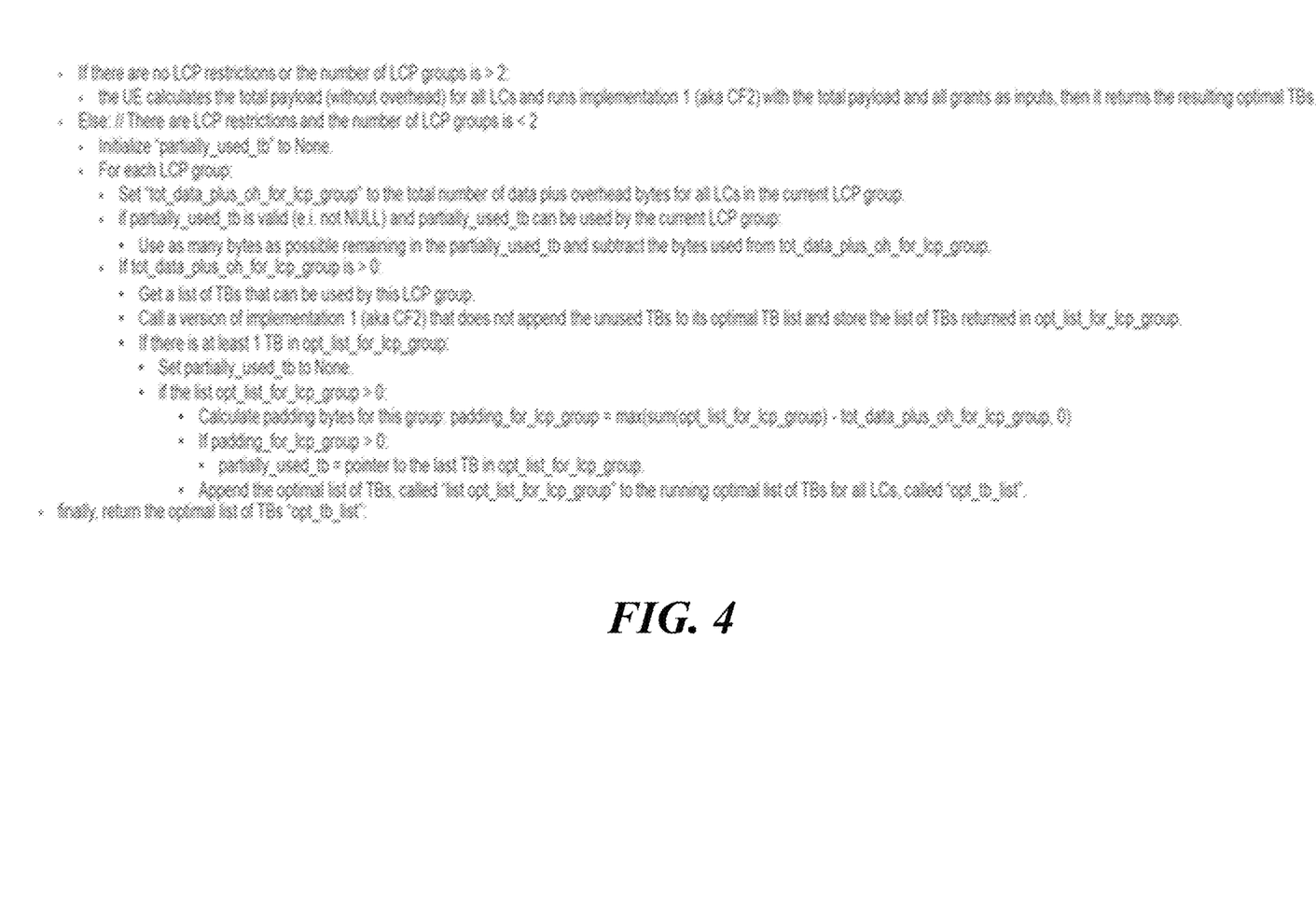
FIG. 4 is a diagram illustrating example pseudocode for a second technique of power optimized grant skipping, in accordance with aspects of the present disclosure.

If there are one or two LCP groups, processing occurs for each LCP group. For the first LCP group, a list of permitted TBs is obtained. The first technique for comparing combinations executes for these TBs, without appending unused TBs to the list. If the last TB of the list is only partially filled, that TB may be used for another LCP group if that other LCP group is permitted to use that TB. When processing for the next group, any eligible partially filled TBs are used before selecting additional TBs and repeating the first technique for comparing combinations. Example pseudocode for this technique is shown in FIG. 4.

Benefits of this second technique may include fast execution speed. When there are no LCP restrictions or the number of LCP groups is greater than two, the execution speed is the same as for the first technique. When there are LCP restrictions and the number of LCP groups is less than or equal to two, the second technique is only slightly slower. Other benefits include the fact that simple LCP restriction scenarios may be handled (less than or equal to two LCP groups), which is likely the most frequently encountered scenario. Some examples of two or fewer LCP groups include ultra-reliable low latency communication (URLLC) (restricted) and enhanced mobile broadband (eMBB) (restricted or not restricted), as well as voice (restricted) and eMBB (restricted or not restricted).

Another benefit of the second technique is that padding reduction performance may be as good as an exhaustive search in the presence of LCP restrictions if no LCP restriction is present, or if LCP restrictions are present with less than two LCP groups. Yet another benefit is that the second technique is easy to implement and has small program code and a small memory footprint. Disadvantages of the second technique may include the fact that only simple LCP restriction scenarios (e.g., two or fewer LCP groups) are considered, data per LC calculation increases memory usage, and the runtime is longer than for the first technique.

In a third technique of the present disclosure, the UE estimates the data plus overhead for each LC using equation (2). For this third technique, the UE searches for the optimal subset of the received grants by performing an exhaustive search of all the permutations of the order of the received grants. This technique contrasts with the first technique, which searches for all combinations instead of permutations. In this third technique, the UE considers LCP restrictions when it assigns the data plus overhead of each LC to the TBs in the current permutation. The UE selects the order that minimizes the total padding bytes. This technique is well suited for two, three, or four TBs, but may become complicated with a large number of TBs.

Benefits of this third technique include the ability to handle LCP restrictions. Other benefits include excellent padding reduction performance even in the presence of LCP restrictions, due to LCP restriction handling and buffer size per LC. Disadvantages to this third technique may include considering data per LC, which increases memory, and longer runtime complexity due to exhaustive search, handling of LCP restrictions, and buffer sizes per LC. The runtime complexity of this technique is $O(N_{TB}!)$ In still other aspects of the present disclosure, the UE may combine less complex techniques with one of the more complex techniques to form a hybrid solution. In these aspects, the UE may decide which algorithm it should use based on the presence or absence of LCP restrictions and the number of grants received. The UE then executes the best solution for the current scenario. In some implementations, if LCP restrictions are detected and the number of grants received ($N_{grants\ received}$) is less than or equal to a threshold ($N_{grants,threshold}$), the UE selects the second or third technique based on available compute cycles. For example, if the number of LCP restrictions and the number of grants is large, a less complex technique (e.g., the second technique) is selected. Otherwise, if there are no LCP restrictions or the number of grants is larger than the threshold, the UE selects the first technique.

Benefits of the hybrid solution may include fast execution when LCP restrictions are not present. Other benefits include the ability to handle LCP restrictions up to a threshold amount of grants ($N_{grants,threshold}$), which may be dimensioned to serve the majority of cases or UE capabilities. Still other benefits may include excellent padding reduction performance for the majority of scenarios. An exception may be that performance is sub-optimal when the number of grants received is greater than or equal to $N_{grants,threshold}$, or the number of LCP groups is greater than two. Disadvantages may include that it specifies data per LC, which increases shared memory and longer runtime complexity. The runtime complexity is $O(2^{N_{TB}})$ the majority of the time and $O(N_{TB}!)$ in cases where LCP restrictions are observed.

In still other aspects of the present disclosure, the UE first identifies mandatory TBs. Mandatory TBs may include TBs containing uplink control information (UCI) and/or TBs that satisfy LCP restricted data. Non-mandatory TBs may be labeled as optional TBs. The UE then determines whether a slot has any optional TBs. If so, and the total buffer size is smaller than a sum of all grants and there is enough time to execute one of the techniques described above, the UE generates a TB list. The TB list includes mandatory TBs first. The optional TBs are listed after the mandatory TBs in an order based on the selected technique, such as the first technique described previously.

Calculating total transmission power, total energy, or total energy per bit or byte to compare subsets of grants relies upon the transmission power allocation that will be used for the subset of grants. The transmission power allocation is generally not available until after the UE has decided which grants to skip. Moreover, the transmission power allocation is a time consuming metric to calculate. Total padding bytes transmitted are used in place of the total transmission power, total energy, or total energy per bit/byte used to transmit the user data due to the simplicity and speed of calculating and comparing total padding bytes. Total padding bytes may be used to select a power and energy efficient transmission because the path loss of all the uplink grants received for a cell group may be comparable because they are transmitted in the same frequency band to the same cell. Aspects of the present disclosure make use of the assumption that the transmission power and energy used to transmit a byte on a grant will be comparable to that of transmitting a byte on another grant. Using this assumption, the minimization of total padding bytes to send the user data is expected to have a similar effect as minimizing total transmission power, total energy, and energy used per bit/byte, but with lower complexity.

The presently disclosed techniques for generating an uplink grant order should run as quickly as possible because the techniques run in the online path for uplink transmission (e.g., downlink control information (DCI) to grant manager (GM) to uplink L2 TB building). The techniques of the present disclosure enable more efficient uplink transmissions because the UE uses a more power efficient subset of grants with less padding to transmit. Moreover, the UE is more likely to skip additional grants, leading to longer battery life and the UE being limited less often by the specific absorption rate (SAR) and maximum permissible exposure (MPE) compliance modules. Other advantages include improvement in TCP downlink performance (e.g., throughput) due to timely TCP downlink feedback (e.g., acknowledgments/negative acknowledgments (ACKs/

NACKs)) if the uplink is not limited by SAR or MPE modules as frequently. In some aspects, the UE experiences better battery power conservation due to increased uplink transmission efficiency due to less padding and fewer TBs used.

By reducing the frequency of MPE limits for a UE, there may be a lower chance of the UE being prevented from sending critical control information, such as a power headroom report (PHR) and buffer status report (BSR), to the network. Additionally, the presently disclosed techniques enable more efficient use of the MPE power budget, which allows the UE to transmit for longer (e.g., better MPE duty cycle). Timely transmission of high priority uplink control information (UCI) results because the MPE budget is used more efficiently, allowing the PUCCH and small L2 control packets to be transmitted in a portion of the uplink grant. The UE may prioritize and transmit high priority traffic efficiently given MPE limits.

Uplink transmission reliability may be improved when a UE is power-limited (e.g., MPE power-limited) and the UE only sends a small amount of data and does not need all the received grants. There is a risk that without prioritization, the UE may use larger TB(s) than necessary and/or the UE may use more TBs than necessary, which causes the total available transmission power to be spread across a wider bandwidth or more TBs, leading to a less reliable transmission (e.g., lower block error ratio (BLER)). The UE may use some of the previously described techniques to select a smaller and more appropriate transmission size and increase its power to improve the BLER to meet ~10% BLER.

As indicated above, FIGS. 3-4 are provided as examples. Other examples may differ from what is described with respect to FIGS. 3-4.

Figure 5:
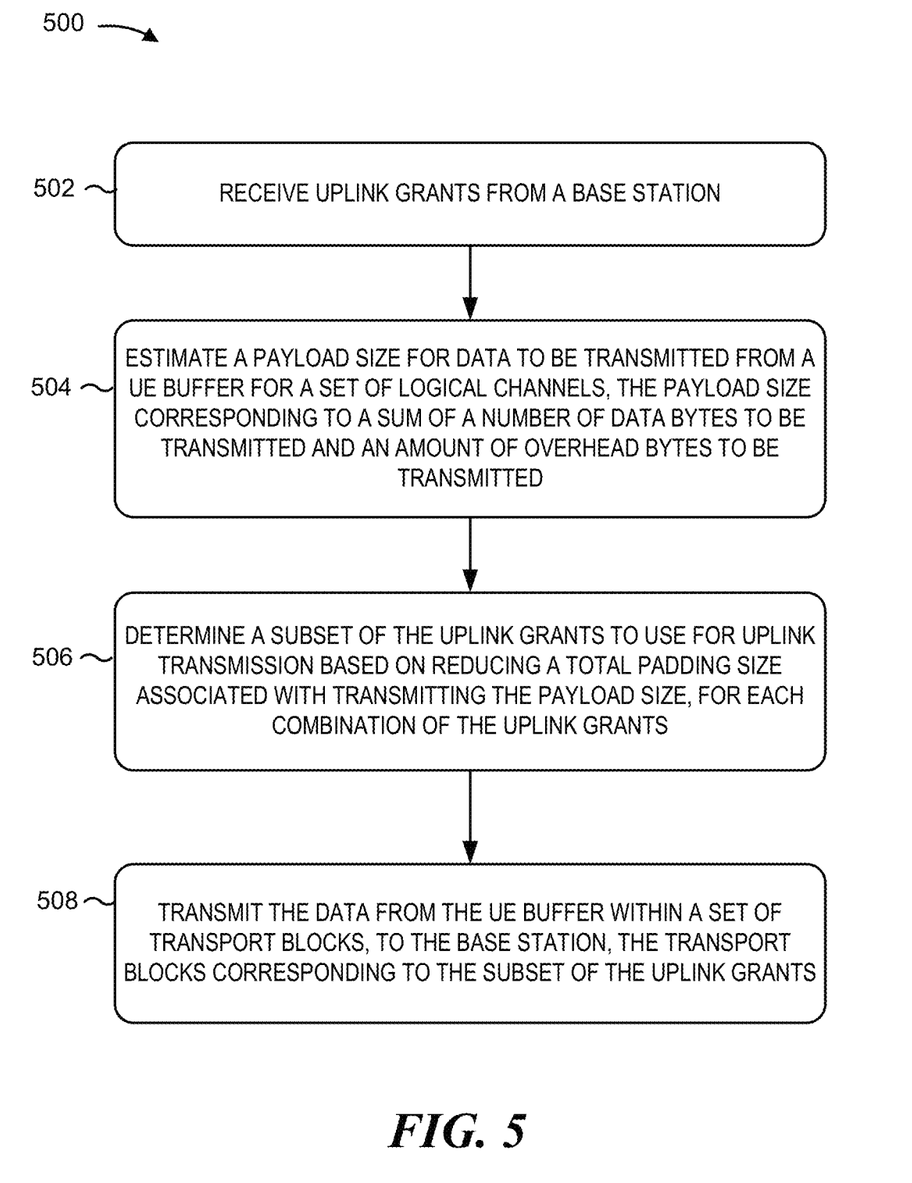
FIG. 5 is a flow diagram illustrating an example process performed, for example, by a UE, in accordance with various aspects of the present disclosure.

FIG. 5 is a flow diagram illustrating an example process 500 performed, for example, by a UE, in accordance with various aspects of the present disclosure. The operations of the example process 500 may be implemented by the UE 120, described with reference to FIGS. 1 and 2. At block 502, the user equipment (UE) receives a number of uplink grants from a base station. For example, the UE (e.g., using the antenna 252, demodulator (DEMOD) 254, multiple-input multiple-output (MIMO) detector 256, receive processor 258, controller/processor 280, memory 282, and/or the like) may receive the uplink grants.

At block 504, the UE estimates a payload size for data to be transmitted from a UE buffer for a number of logical channels, the payload size corresponding to a sum of a number of data bytes to be transmitted and an amount of overhead bytes to be transmitted. For example, the UE (e.g., using the data sink 260, data source 262, controller/processor 280, memory 282, and/or the like) may estimate the payload size based on a 5% value for overhead according to equation 1 or equation 2.

At block 506, the UE determines a subset of the number of uplink grants to use for uplink transmission based on reducing a total padding size associated with transmitting the payload size, for each combination of the number of uplink grants. For example, the UE (e.g., using the data sink 260, data source 262, controller/processor 280, memory 282, and/or the like) may determine the subset of the uplink grants based on all combinations or permutations of the uplink grants. The subset may be sorted from a largest grant to a smallest grant. A second list may include uplink grants not in the subset. The subset may also be determined based on LCP restrictions for each of the logical channels.

At block 508, the UE transmits the data from the UE buffer within a number of transport blocks, to the base station, the number of transport blocks corresponding to the subset of the number of uplink grants. For example, the UE (e.g., using the antenna 252, modulator (MOD) 254, TX multiple-input multiple-output (MIMO) processor 266, transmit processor 264, controller/processor 280, memory 282, and/or the like) may transmit the data. Transmission of the uplink data may be based on the grants in the list.

Figure 6:
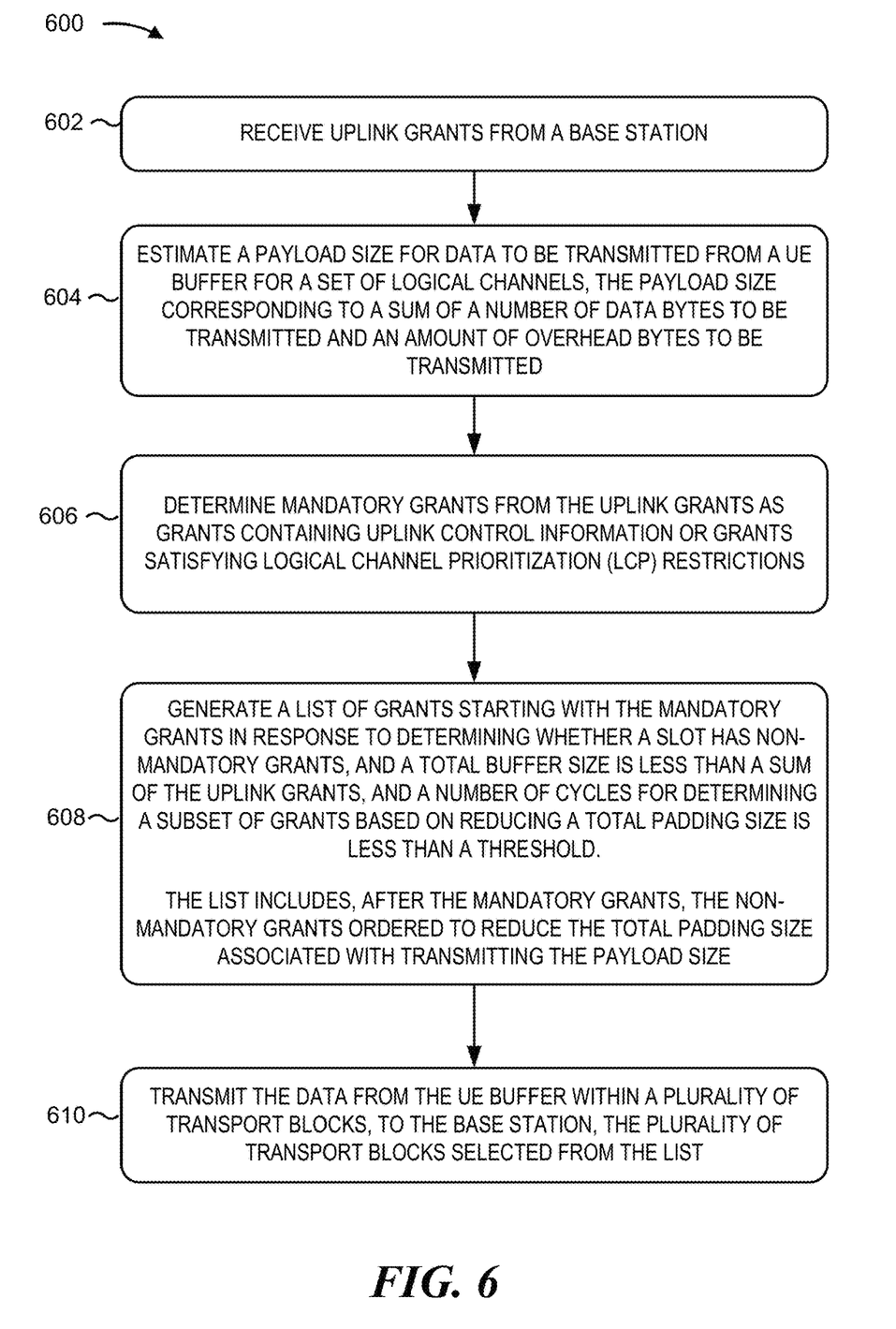
FIG. 6 is a flow diagram illustrating an example process performed, for example, by a UE, in accordance with various aspects of the present disclosure.

FIG. 6 is a flow diagram illustrating an example process 600 performed, for example, by a UE, in accordance with various aspects of the present disclosure. The operations of the example process 600 may be implemented by the UE 120, described with reference to FIGS. 1 and 2. At block 602, the UE receives a number of uplink grants from a base station. For example, the UE (e.g., using the antenna 252, demodulator (DEMOD) 254, multiple-input multiple-output (MIMO) detector 256, receive processor 258, controller/processor 280, memory 282, and/or the like) may receive the uplink grants.

At block 604, the UE estimates a payload size for data to be transmitted from a UE buffer for a number of logical channels, the payload size corresponding to a sum of a number of data bytes to be transmitted and an amount of overhead bytes to be transmitted. For example, the UE (e.g., using the data sink 260, data source 262, controller/processor 280, memory 282, and/or the like) may estimate the payload size based on equation 1 or equation 2.

At block 606, the UE determines mandatory grants from the number of uplink grants as grants containing uplink control information or grants satisfying logical channel prioritization (LCP) restrictions. For example, the UE (e.g., using the data sink 260, data source 262, controller/processor 280, memory 282, and/or the like) may determine the mandatory grants from the number of uplink grants. Non-mandatory TBs may be labeled as optional TBs.

At block 608, the UE generates a list of grants starting with the mandatory grants in response to determining whether a slot has non-mandatory grants, determining whether a total buffer size is less than a sum of the number of uplink grants, and determining whether a number of cycles for determining a subset of grants based on reducing a total padding size is less than a threshold. The list includes, after the mandatory grants, the non-mandatory grants ordered to reduce the total padding size associated with transmitting the payload size. For example, the UE (e.g., using the data sink 260, data source 262, controller/processor 280, memory 282, and/or the like) may generate the list of grants.

At block 610, the UE transmits the data from the UE buffer within a number of transport blocks, to the base station, the number of transport blocks selected from the list. For example, the UE (e.g., using the antenna 252, modulator (MOD) 254, TX multiple-input multiple-output (MIMO) processor 266, transmit processor 264, controller/processor 280, memory 282, and/or the like) may transmit the data. Transmission of the uplink data may be based on the grants in the list.

Implementation examples are described in the following numbered clauses.

1. A method of wireless communication by a user equipment (UE), comprising:
receiving a plurality of uplink grants from a base station;
estimating a payload size for data to be transmitted from a UE buffer for a plurality of logical channels, the payload size corresponding to a sum of a number of data bytes to be transmitted and an amount of overhead bytes to be transmitted;

determining a subset of the plurality of uplink grants to use for uplink transmission based on reducing a total padding size associated with transmitting the payload size, for each combination of the plurality of uplink grants; and transmitting the data from the UE buffer within a plurality of transport blocks, to the base station, the plurality of transport blocks corresponding to the subset of the plurality of uplink grants.

2. The method of clause 1, further comprising generating a first list of grants including the subset in a sorted order.

3. The method of clause 1 or 2, in which the subset is sorted from a largest grant with a lowest sequence number (SN) to a smallest grant with a highest SN.

4. The method of any of the preceding clauses, further comprising generating a second list of grants including uplink grants not in the subset and sorted from a smallest unused grant to a largest unused grant.

5. The method of any of the preceding clauses, further comprising determining the subset based on logical channel prioritization (LCP) restrictions for each of the plurality of logical channels.

6. The method of any of the preceding clauses, in which determining the subset based on the LCP restrictions comprises:

generating a list of LCP groups based on LCP restrictions of each of the plurality of logical channels;

determining selected grants permitted for each LCP group in response to each LCP group having data to transmit; and limiting the subset to the selected grants.

7. The method of any of the preceding clauses, further comprising including within the subset a partially filled transport block from a prior LCP group, for a next LCP group.

8. The method of any of the preceding clauses, further comprising ignoring the LCP restriction when more than a threshold number of LCP groups exist.

9. The method of any of the preceding clauses, in which the determining is based on each permutation of the plurality of uplink grants.

10. The method of any of the preceding clauses, further comprising determining based on each permutation or determining based on each combination, depending on whether LCP restrictions are detected and whether a quantity of the plurality of uplink grants exceeds a threshold.

11. A method of wireless communication by a user equipment (UE), comprising:

receiving a plurality of uplink grants from a base station;

estimating a payload size for data to be transmitted from a UE buffer for a plurality of logical channels, the payload size corresponding to a sum of a number of data bytes to be transmitted and an amount of overhead bytes to be transmitted;

determining mandatory grants from the plurality of uplink grants as grants containing uplink control information or grants satisfying logical channel prioritization (LCP) restrictions;

generating a list of grants starting with the mandatory grants in response to determining whether a slot has non-mandatory grants, and a total buffer size is less than a sum of the plurality of uplink grants, and a number of cycles for determining a subset of grants based on reducing a total padding size is less than a threshold, the list including, after the mandatory grants, the non-mandatory grants ordered to reduce the total padding size associated with transmitting the payload size; and transmitting the data from the UE buffer within a plurality of transport blocks, to the base station, the plurality of transport blocks selected from the list.

12. An apparatus for wireless communication by a user equipment (UE) comprising:

a memory; and at least one processor coupled to the memory, the at least one processor configured:

to receive a plurality of uplink grants from a base station;

to estimate a payload size for data to be transmitted from a UE buffer for a plurality of logical channels, the payload size corresponding to a sum of a number of data bytes to be transmitted and an amount of overhead bytes to be transmitted;

to determine a subset of the plurality of uplink grants to use for uplink transmission based on reducing a total padding size associated with transmitting the payload size, for each combination of the plurality of uplink grants; and to transmit the data from the UE buffer within a plurality of transport blocks, to the base station, the plurality of transport blocks corresponding to the subset of the plurality of uplink grants.

13. The apparatus of clause 12, in which the at least one processor is further configured to generate a first list of grants including the subset in a sorted order.

14. The apparatus of clause 12 or 13, in which the at least one processor is further configured to sort the subset from a largest grant with a lowest sequence number (SN) to a smallest grant with a highest SN.

15. The apparatus of any of the clauses 12-14, in which the at least one processor is further configured to generate a second list of grants including uplink grants not in the subset and sorted from a smallest unused grant to a largest unused grant.

16. The apparatus of any of the clauses 12-15, in which the at least one processor is further configured to determine the subset based on logical channel prioritization (LCP) restrictions for each of the plurality of logical channels.

17. The apparatus of any of the clauses 12-16, in which the at least one processor is further configured to determining the subset based on the LCP restrictions by:

generating a list of LCP groups based on LCP restrictions of each of the plurality of logical channels;

determining selected grants permitted for each LCP group in response to each LCP group having data to transmit; and limiting the subset to the selected grants.

18. The apparatus of any of the clauses 12-17, in which the at least one processor is further configured to include within the subset a partially filled transport block from a prior LCP group, for a next LCP group. 19. The apparatus of any of the clauses 12-18, in which the at least one processor is further configured to ignore the LCP restriction when more than a threshold quantity of LCP groups exist.

20. The apparatus of any of the clauses 12-19, in which the at least one processor is further configured to determine based on each permutation of the plurality of uplink grants.

21. The apparatus of any of the clauses 12-20, in which the at least one processor is further configured to determine based on each permutation or each combination, depending on whether LCP restrictions are detected and whether a quantity of the plurality of uplink grants exceeds a threshold.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving a plurality of uplink grants from a base station;
   estimating a payload size for data to be transmitted from a UE buffer for a plurality of logical channels, the payload size corresponding to a sum of a quantity of data bytes to be transmitted and an amount of overhead bytes to be transmitted;
   determining a subset of the plurality of uplink grants to use for uplink transmission based on reducing a total padding size associated with transmitting the payload size, for each combination of the plurality of uplink grants, at least one of the combinations including two or more uplink grants; and
   transmitting the data from the UE buffer within a plurality of transport blocks, to the base station, the plurality of transport blocks corresponding to the subset of the plurality of uplink grants.

2. The method of claim 1, further comprising generating a first list of grants including the subset in a sorted order.

3. The method of claim 2, in which the subset is sorted from a largest grant with a lowest sequence number (SN) to a smallest grant with a highest SN.

4. The method of claim 2, further comprising generating a second list of grants including uplink grants not in the subset and sorted from a smallest unused grant to a largest unused grant.

5. The method of claim 4, further comprising determining the subset based on logical channel prioritization (LCP) restrictions for each of the plurality of logical channels.

6. The method of claim 5, in which determining the subset based on the LCP restrictions comprises:
   generating a list of LCP groups based on LCP restrictions of each of the plurality of logical channels;
   determining selected grants permitted for each LCP group in response to each LCP group having data to transmit; and
   limiting the subset to the selected grants.

7. The method of claim 6, further comprising including within the subset a partially filled transport block from a prior LCP group, for a next LCP group.

8. The method of claim 5, further comprising ignoring the LCP restrictions when more than a threshold quantity of LCP groups exist.

9. The method of claim 4, in which the determining is based on each permutation of the plurality of uplink grants.

10. The method of claim 9, further comprising determining based on each permutation or determining based on each combination, depending on whether LCP restrictions are detected and whether a quantity of the plurality of uplink grants exceeds a threshold.

11. A method of wireless communication by a user equipment (UE), comprising:
   receiving a plurality of uplink grants from a base station;
   estimating a payload size for data to be transmitted from a UE buffer for a plurality of logical channels, the payload size corresponding to a sum of a number of data bytes to be transmitted and an amount of overhead bytes to be transmitted;
   determining mandatory grants from the plurality of uplink grants as grants containing uplink control information or grants satisfying logical channel prioritization (LCP) restrictions;
   generating a list of grants starting with the mandatory grants in response to determining whether a slot has non-mandatory grants, and a total buffer size is less than a sum of the plurality of uplink grants, and a number of cycles for determining a subset of grants based on reducing a total padding size is less than a threshold, the list including, after the mandatory grants, the non-mandatory grants ordered to reduce the total padding size associated with transmitting the payload size; and
   transmitting the data from the UE buffer within a plurality of transport blocks, to the base station, the plurality of transport blocks selected from the list.

12. An apparatus for wireless communication by a user equipment (UE) comprising:
   a memory; and
   at least one processor coupled to the memory, the at least one processor configured:

to receive a plurality of uplink grants from a base station;

to estimate a payload size for data to be transmitted from a UE buffer for a plurality of logical channels, the payload size corresponding to a sum of a quantity of data bytes to be transmitted and an amount of overhead bytes to be transmitted;

to determine a subset of the plurality of uplink grants to use for uplink transmission based on reducing a total padding size associated with transmitting the payload size, for each combination of the plurality of uplink grants, at least one of the combinations including two or more uplink grants; and to transmit the data from the UE buffer within a plurality of transport blocks, to the base station, the plurality of transport blocks corresponding to the subset of the plurality of uplink grants.

13. The apparatus of claim 12, in which the at least one processor is further configured to generate a first list of grants including the subset in a sorted order.

14. The apparatus of claim 13, in which the at least one processor is further configured to sort the subset from a largest grant with a lowest sequence number (SN) to a smallest grant with a highest SN.

15. The apparatus of claim 13, in which the at least one processor is further configured to generate a second list of grants including uplink grants not in the subset and sorted from a smallest unused grant to a largest unused grant.

16. The apparatus of claim 15, in which the at least one processor is further configured to determine the subset based on logical channel prioritization (LCP) restrictions for each of the plurality of logical channels.

17. The apparatus of claim 16, in which the at least one processor is further configured to determining the subset based on the LCP restrictions by:

generating a list of LCP groups based on LCP restrictions of each of the plurality of logical channels;

determining selected grants permitted for each LCP group in response to each LCP group having data to transmit; and limiting the subset to the selected grants.

18. The apparatus of claim 17, in which the at least one processor is further configured to include within the subset a partially filled transport block from a prior LCP group, for a next LCP group.

19. The apparatus of claim 16, in which the at least one processor is further configured to ignore the LCP restrictions when more than a threshold quantity of LCP groups exist.

20. The apparatus of claim 15, in which the at least one processor is further configured to determine based on each permutation of the plurality of uplink grants.

21. The apparatus of claim 20, in which the at least one processor is further configured to determine based on each permutation or each combination, depending on whether LCP restrictions are detected and whether a quantity of the plurality of uplink grants exceeds a threshold.

22. An apparatus for wireless communication by a user equipment (UE) comprising:

a memory; and at least one processor coupled to the memory, the at least one processor configured:

to receive a plurality of uplink grants from a base station;

to estimate a payload size for data to be transmitted from a UE buffer for a plurality of logical channels, the payload size corresponding to a sum of a number of data bytes to be transmitted and an amount of overhead bytes to be transmitted;

to determine mandatory grants from the plurality of uplink grants as grants containing uplink control information or grants satisfying logical channel prioritization (LCP) restrictions;

to generate a list of grants starting with the mandatory grants in response to determining whether a slot has non-mandatory grants, and a total buffer size is less than a sum of the plurality of uplink grants, and a number of cycles for determining a subset of grants based on reducing a total padding size is less than a threshold, the list including, after the mandatory grants, the non-mandatory grants ordered to reduce the total padding size associated with transmitting the payload size; and to transmit the data from the UE buffer within a plurality of transport blocks, to the base station, the plurality of transport blocks selected from the list.

* * * * *